Figure 1:
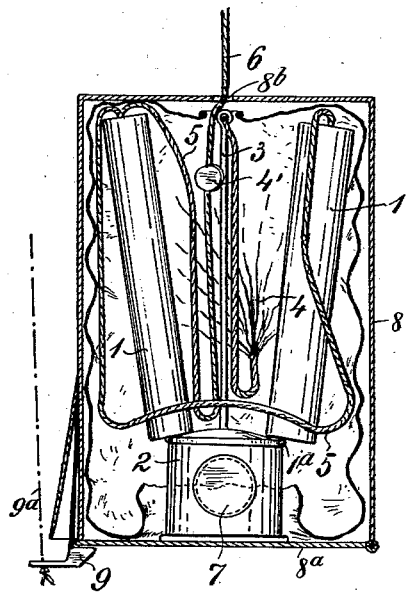

E. HYRA & K. KLINKOSCH.
PYROTECHNICAL ILLUMINATING DEVICE.
APPLICATION FILED OCT. 16, 1913.

1,095,869.

Patented May 5, 1914.
2 SHEETS—SHEET 1.

WITNESSES

INVENTORS
EMIL HYRA
KARL KLINKOSCH
BY
ATTORNEYS

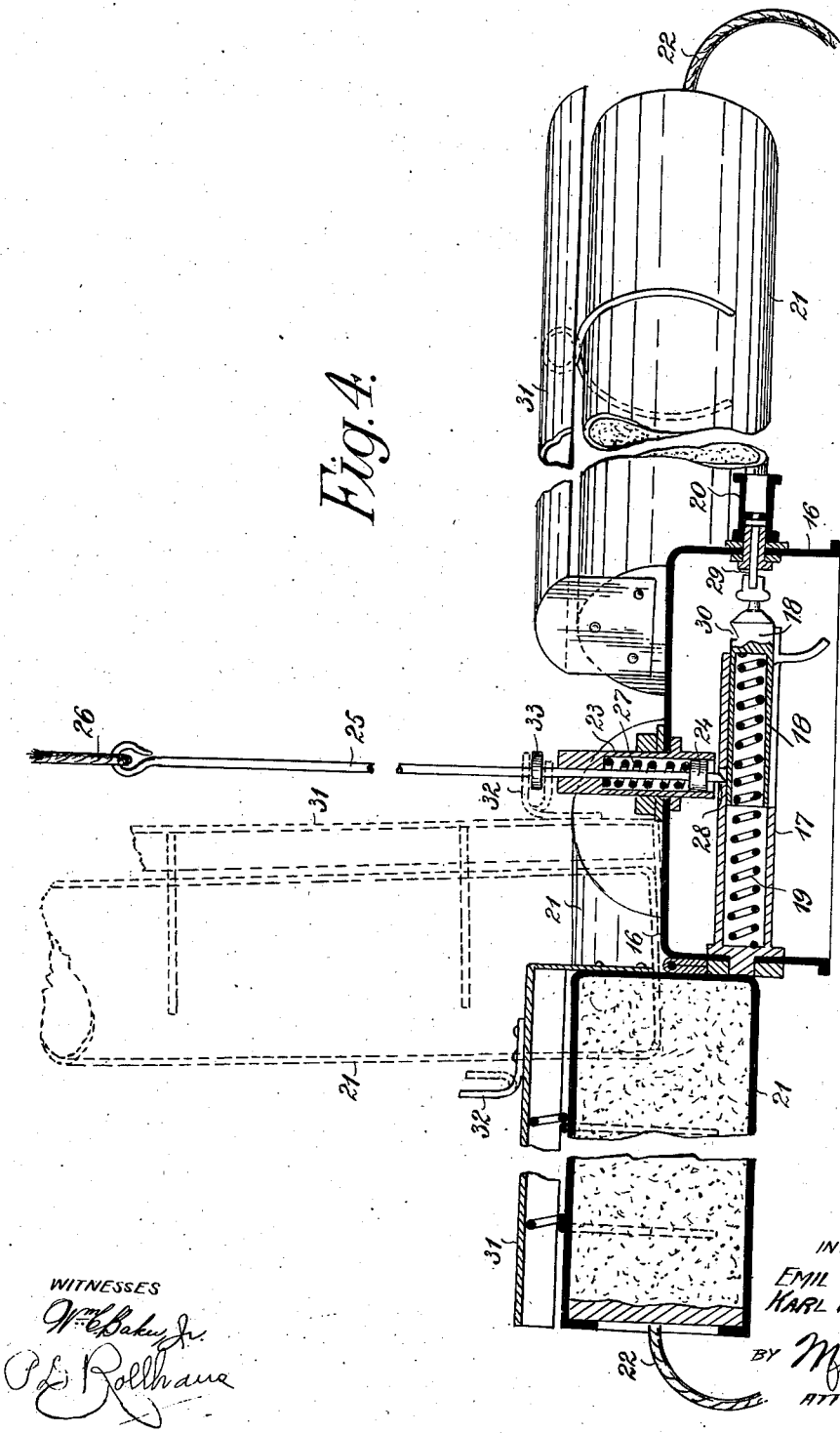

UNITED STATES PATENT OFFICE.

EMIL HYRA AND KARL KLINKOSCH, OF VIENNA, AUSTRIA-HUNGARY.

PYROTECHNICAL ILLUMINATING DEVICE.

1,095,869. Specification of Letters Patent. Patented May 5, 1914.

Application filed October 16, 1913. Serial No. 795,469.

*To all whom it may concern:*

Be it known that we, EMIL HYRA and KARL KLINKOSCH, both subjects of the Emperor of Austria-Hungary, and residents of Vienna, Empire of Austria-Hungary, have invented certain new and useful Improvements in Pyrotechnical Illuminating Devices, of which the following is a full, clear, and exact description, such as will enable others skilled in the art to make and use the same.

Our invention relates to devices for igniting pyrotechnical luminous bodies on dropping the same from a height more particularly from an air craft floating in the air.

In the following description it will be assumed that the invention is applied to an air craft.

It has already been proposed to ignite or kindle a pyrotechnical luminous body dropped from an aircraft by means of a parachute and a cord connecting such parachute with the said body in such a manner that both, the parachute and the said body are dropped from the aircraft whereby owing to the difference between the speed of the parachute and that of the body friction is set up between the cord and a friction fuse and thus the luminous pyrotechnical body is ignited. It has been found that the operation of the device is more reliable if the means which actuate the igniting or kindling device (that is the cord or the like) are connected fast with the aircraft.

According to the present invention the igniting device is contained and locked in a casing provided on the aircraft. When the igniting device is released and is thrown or dropped from the said casing a fuse is fired and thereby the luminous body or bodies is or are ignited.

Another modification consists in utilizing the influence exerted by the difference between the falling accelerations of the luminous body and the parachute on the means connecting the luminous body and the parachute for the purposes of releasing a locking device which, when in a normal position, prevents the automatic device from working. The difference between the falling accelerations of the luminous body and the parachute can be also utilized for closing an electric circuit which permits of or causes the operations of the igniting device. Finally, the closing of an electric circuit influencing an igniting device, can be effected by suitable means which are locked in their normal position by the casing or the part connected therewith, but which alter their position when the device leaves the casing and thus establishes an electric contact.

Further, another modification consists in making the frame carrying the luminous body, capable of receiving written communications and thus permitting of such messages being thrown overboard from an aircraft at night, the kindled luminous body indicating the place where the manuscripts rest on the ground.

The invention is clearly illustrated on the accompanying drawings whereon—

Figure 2:
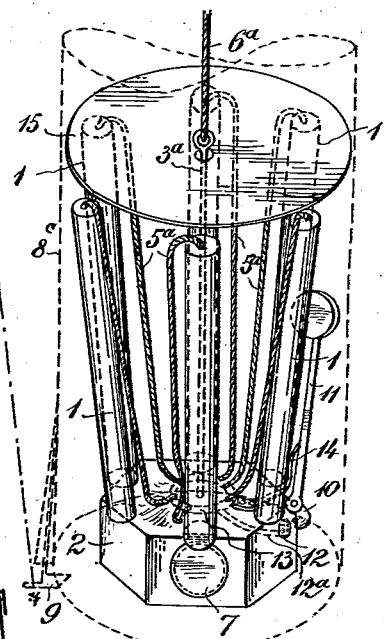
Figure 3:
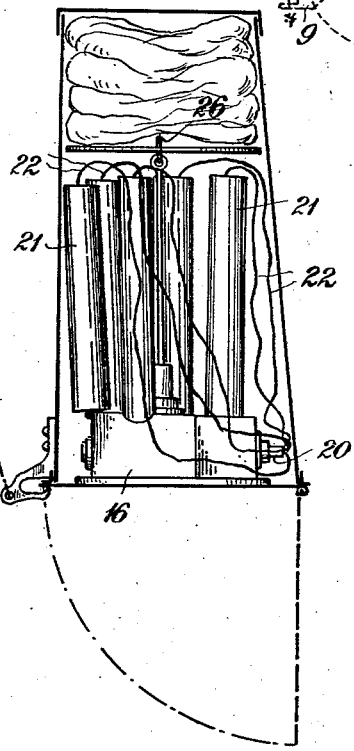

Figure 1 shows the luminous body in section. Fig. 2 shows another modification. Fig. 3 shows a further modification. Fig. 4 is a section of Fig. 3.

In Fig. 1 the luminous bodies 1 are cylindrical in shape and are hinged on the upper edge of the casing 2, as at $1^a$. Each hinge is fixed on the cylindrical base of the luminous body in the direction of its diameter and in this manner the casing 2 forms a stop for the angular movements of the body for one half of the latter's base would have to rest on said casing. The upper part of the casing 2 is joined to a rod 3 to which the parachute cords 4 are fastened. The upper face of the casing 2 is upwardly curved from its edges to the center in such a manner that the bodies fixed on the edges will be disposed at an outward angle and must drop outwardly. The bodies 1 are each connected with the fuse $4'$ by means of match cords 5. The cord 6 one end of which is embedded in the fuse and which, when drawn tight fires the fuse, passes through the upper orifice in the center of the parachute to the aircraft and is fixed thereto. The casing 2 is provided with a cylindrical opening in one of its walls and has a cylinder 7 fitted therein which serves for carrying written messages. The whole device with its luminous bodies is inserted in a casing 8 the hinged bottom $8^a$ of which is locked in its closed position by a spring catch 9 controlled from the air craft in any suitable manner. As soon as the cord $9^a$ leading to the said spring-catch and indicated by dotted line Fig. 1 is pulled from the aircraft the bottom of the casing 8 is opened, and the whole device contained therein drops out of the receptacle, the luminous bodies drop into horizontal position or beyond, and under the influence of the weight of these bodies, the fuse is fired the cord 6 remaining attached to the aircraft and the luminous bodies are kindled. The tilting of the luminous bodies may if desired be aided by springs acting on said bodies. In this case, the ignition instead of being caused by the cord fixed to the aircraft could be put into action by one or more cords fastened on the rod 3, which would be connected with one or more fuses fixed on one or more luminous bodies.

In the modification shown in Fig. 2 an automatic percussion fuse is used. The casing 2 carrying the luminous bodies is provided with a hammer 10 connected to weighted lever 11. This lever lies on the wall of the receptacle $8^c$, when the device is inoperative so that the hammer cannot hit the cartridge or primer 12 fixed on the wall of the casing 2. From the primer 12 a match cord $12^a$ leads to an ignition charge 13 fixed in the casing 2 wherefrom other match cords $5^a$ lead to the luminous bodies 1. The casing 2 is connected to the parachute cords by rod $3^a$ and cords $6^a$ in a similar manner as described in connection with Fig. 1 and is also provided with a cover which rises toward the center in order to facilitate the outward falling of the luminous bodies. In order to prevent any rocking of the apparatus within the receptacle a disk 15 is fixed on the rod 3, said disk being of the same diameter as the receptacle. When the hinged bottom of the receptacle is released the apparatus drops out, the luminous bodies tilt outward and the hammer 10 operated by the dropping weighted lever 11 strikes the primer 12 and the illuminating bodies are ignited. The working of the lever 11 can be aided by a spring 14 or this spring can act alone on the hammer in which case the latter is locked, when the apparatus is inoperative by one of its surfaces engaging with the wall of the receptacle whereby any movement on the part of the hammer in the direction of the primer is prevented. The described arrangement may be varied in many ways without departing from the invention. A frictional ignition could also be substituted for an impact ignition in such a manner that when the apparatus is dropping out of the receptacle, a readily inflammable substance connected therewith and with the ignition charge rubs against a rough surface provided on the receptacle and is thus fired. In order to easily overcome the friction a spring can be provided within the receptacle which tends to push the apparatus out of the receptacle.

A further modification of the invention is shown in Fig. 3, the device being at rest, while Fig. 4 shows it in section, immediately after it has left the casing. The box 16 is provided with a cylinder 17 in which the firing pin 18 slides the firing pin being actuated by the spring 19. In the wall of the box 16 opposite the firing pin, a small pipe 29 is inserted which receives the primer or cartridge. This pipe ends in a wide but short pipe 20 which receives the ends of the match cords 22 fixed on the luminous bodies 21. The bodies 21 are hinged on the box 16 so that they tilt outward on leaving the box into a horizontal, or practically horizontal position. The upper wall or cover of the box 16 is provided with a cylinder 23 provided with a piston 24, which is secured to the rod 25 to which the parachute cords are fastened. A spring 27 in the cylinder 23 rests on the bottom of the cylinder and acts on the piston 24 to push the rod 25 downward. When at rest the firing pin 18 is pushed backward against the compression of the spring 19 and is maintained in this position by means of the rod 25 which, passing through an orifice 28 made in the cylinder 17, engages into a notch 30 of the firing pin. When the hinged bottom of the casing is opened in the manner above described the apparatus will drop out of the casing, the parachute cords 26 will be tightened thereby lifting the rod 25, against the action of the spring 27, out of the notch 30 of the firing pin. The latter will, consequently, be thrown forward by the spring 19 and the cartridge in the pipe 20 fired and the match cord or cords and luminous bodies thereby ignited. The piston 24 is then at the bottom of the cylinder 23 and carries the whole illuminating device. As it has been found, that the glaring light of the burning luminous body blinds the observer seated in the aircharft, screens 31 have been provided, for the luminous bodies connected thereto and arranged immediately above them, as shown in Fig. 4, the said screens keep the burning luminous bodies out of the sight of the observer but do not interfere with the observations of the illuminated ground. In order to prevent any accidental release of the locking device when the apparatus is at rest, the luminous bodies or one of the screens 31 can be provided with a spring controlled arm 32 which normally engages with a collar 33 fixed on the rod 25 so that the upward movement of the rod is only possible after the tilting of the luminous bodies has disengaged the arm 32 from the collar 33. If the end of the spring controlled arm 32 is forked, as shown dotted in Fig. 4 so that it grips the joint 33 when at rest from above and below then the lower prong will push the point 33 upward when the luminous bodies are turned outward and thus the rod 25 will release the firing pin 18 and thereby permit of its operation irrespective of the difference in falling accelerations between the parachute and the luminous bodies. The movement of the rod 25 under the influence of the tightened parachute cords could be utilized for the closing of an electric circuit which would ignite the luminous cartridge either electrically or by releasing a lock for the ignition device similar to the one described above. To this end, it is only necessary to provide the box 16 with an electric current source, such as a dry element or the like, into which circuit any known electric or electromagnetic ignition device is interposed or it may be provided with devices for the release of the locking devices by electromagnetic means such as solenoids or the like. The closing of the electric circuit need not be effected by means of the stretching of the parachute cords, that is by means of the rod establishing the connection between the cords and the luminous bodies as it may be effected by the alteration of position of some parts of the device on leaving the casing, for instance such as by the tilting of the luminous bodies into the horizontal position, or by a separate weighted lever, or by spring controlled means locked by the casing itself.

Claims:

1. In a device of the character described, the combination of a receptacle adapted to be mounted in an air craft, illuminating bodies and a parachute mounted in such a receptacle, means for disengaging and dropping such illuminating bodies and parachute from the said receptacle, means for igniting the illuminating bodies, means for mechanically connecting the parachute to the illuminating bodies, a locking device for the said igniting means interposed in such connecting means, and means for releasing the said locking device, such releasing means being adapted to be operated in the downward movement of the illuminating bodies and the parachute.

2. In a device of the character described, the combination of a receptacle adapted to be mounted in an air craft, a casing mounted in such receptacle and having a top plate inclined upward and inward, illuminating bodies hinged to the edge of the cover, a parachute mounted in such a receptacle, means for disengaging and dropping such illuminating bodies and parachute from the said receptacle, means for igniting the illuminating bodies, and means for operating the said igniting means and adapted to be operated in the downward movement of the illuminating bodies.

3. In a device of the character described, the combination of a receptacle adapted to be mounted in an air craft, illuminating bodies mounted in such receptacle and adapted to tilt outward and to engage with the walls of the said receptacle, means for disengaging and dropping such illuminating bodies from the said receptacle, means for igniting the illuminating bodies, means for operating such igniting means and adapted to be operated in the downward movement of the illuminating bodies, means for locking the said igniting means, and an arm connected with one of the illuminating bodies and adapted to engage with the said locking means.

4. In a device of the character described, the combination of a receptacle adapted to be mounted in an air craft, illuminating bodies mounted in such receptacle and adapted to tilt outward and engage with the walls of the said receptacle, means for disengaging and dropping such illuminating bodies from the said receptacle, means for igniting the illuminating bodies, means for operating such igniting means and adapted to be operated in the downward movement of the illuminating bodies, means for locking the said igniting means, and a forked arm connected with one of the illuminating bodies and adapted to engage with a projection on the said locking means.

5. In a device of the character described, the combination of a receptacle adapted to be mounted in an air craft, illuminating bodies and a parachute mounted in such a receptacle, means for disengaging and dropping such illuminating bodies and parachute from the said receptacle, means for igniting the illuminating bodies, and means for operating the said igniting means and adapted to be operated in the downward movement of the illuminating bodies, and screens connected with the illuminating bodies arranged at one side of the same.

In testimony whereof we have signed our names to this specification, in the presence of two subscribing witnesses.

EMIL HYRA.
KARL KLINKOSCH.

Witnesses:
JOHANN BINZ,
AUGUST FUGGER.